Patented Sept. 15, 1936

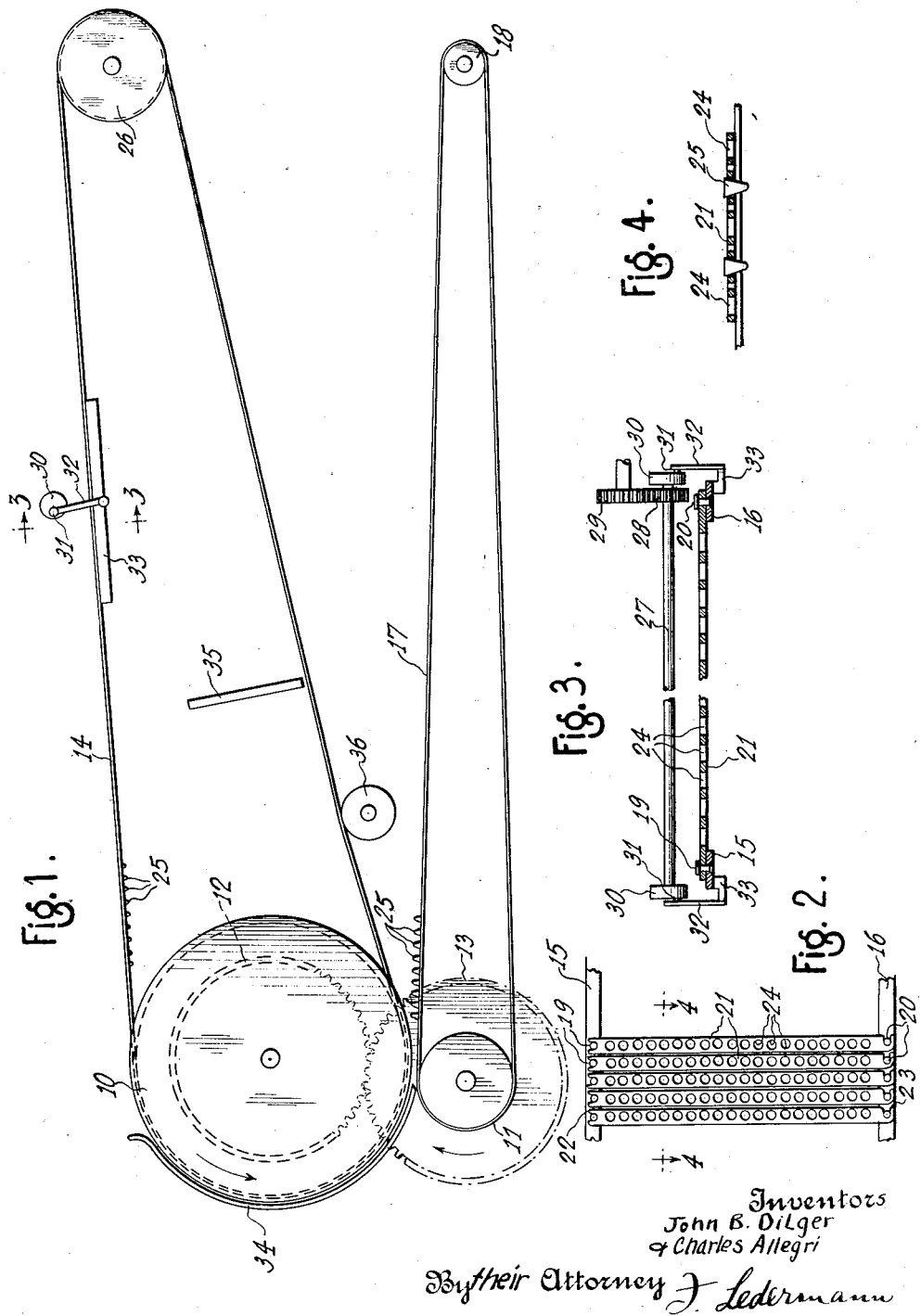

2,054,247

REISSUED

UNITED STATES PATENT OFFICE 2,054,247

CANDY COATING FEEDING MACHINE

John B. Dilger, Lyndhurst, and Charles Allegri, Nutley, N. J.

Application June 13, 1935, Serial No. 26,438

5 Claims. (Cl. 198—30)

The main object of this invention is the provision of a novel feeding device for feeding small candies, nut goods, cakes, biscuits and other food products, chewing gum, and medicine tablets which are to be coated with chocolate or other coating, into a coating machine, in such manner that the candies remain separated from each other while receiving the chocolate or other coating. In the feeding devices commonly used, many of the candies lie too close to each other while being coated, so that upon emergence from the coating machine they are stuck together by the chocolate coating, and such candies must be either discarded as waste, or sold at a loss as "seconds".

The above and other object will become apparent in the description below, in which characters of reference refer to like-named parts in the accompanying drawing.

Referring briefly to the drawing, Figure 1 is a schematic side view of the feeding machine.

Figure 2 is a plan view of a section of the conveyor belt on which the candies to be coated are set by an operator.

Figure 3 is a cross-sectional view taken on the line 3—3 of Figure 1.

Figure 4 is a cross-sectional view taken on line 4—4 of Figure 2.

Referring in detail to the drawing, the numerals 10 and 11 represent respectively a large and a small pulley or roller mutually intermeshed by gears 12 and 13 respectively, each gear being co-axial and rigid on its roller. A conveyor belt 14, consisting of a pair of spaced-apart bands or belts 15 and 16, is trained about the ends of the roller 10. A second conveyor belt 17, extending the width of the roller 11, is trained about the latter at one end and about a second roller 18 at the other, the end 18 of this belt lying adjacent to the intake conveyor belt of the chocolate coating machine, not shown. Either the roller 10 or the roller 11 is driven by a motor, not shown.

The band 15 is provided throughout its length with closely spaced-apart pins 19, and the band 16 with similar pins 20. Candy racks 21, which may be made of light metal such as tin or sheet iron which is beaded or otherwise formed to give them rigidity, are bridged across the bands 15 and 16. Each rack 21 has on one end a rounded slot, a rounded slot 22 with its mouth on the end of the rack, and at its other end a similar slot 23 with its mouth at the side of the rack. It is obvious that the racks are readily removably mounted on the bands 15 and 16 by having the pins 19 and 20 registering in the slots 22 and 23, respectively.

Each rack 21 has a plurality of holes or openings 24 provided throughout its length. These holes, for candies of the "cream drop" variety illustrated, are circular, although their form may be varied for other shapes of candies.

In operation, the un-coated candies 25—25 are deposited on the front end 26 of the conveyor 14. As all of the candies will not fall peak-down into the holes 24, a shaking mechanism is provided to shake the candies into the holes. This comprises a shaft 27 extending the width of the belt 14 having a pinion 28 on one end driven by a gear 29 from a source of power not shown. At either end of the shaft 27 is a disk 30 having on its outer face an eccentric pin 31. A link 32 is pivoted on the pin 31, and at its lower end is provided with a pivoted horizontal tongue 33 engaging the lower edge of the band 15 or 16. While the belt 14 is moving, the gear 29 is rotated rapidly, thus causing a rapid shaking of the belt and causing the candies 25 on the racks 21 to be shaken into the holes 24. To prevent the candies from falling out of the racks while passing around the roller 10, a guard 34 is provided around this roller.

With the candies in the holes of the racks 21, the latter are conveyed around the roller 10, and when they reach the belt 17, which is travelling in the opposite direction, the candies drop out of the racks on to the belt 17 in rows and standing upright. The belt 17 then carries them into the coating machine.

It is to be noted that the candies arrive into the coating machine aligned in rows and spaced-apart from each other, so that it is impossible for two candies to be pasted together by the chocolate coating. A baffle 35 may be mounted in the path of the rising lower side of the belt 14, to wipe off the racks 21 any candies which may have failed to drop out onto the belt 17. An idler roller 36 may be mounted between the baffle 35 and the roller 10 to increase the slope of the lower portion of the belt 14 on leaving the roller 10.

Obviously, modifications in form and structure may be made without departing from the spirit of the invention.

We claim:

1. A device of the class described comprising a roller having a belt band trained about each end thereof, spaced-apart pins on each of said bands, racks having slotted ends engageable in said pins removably mounted on said bands and bridging said bands, said racks having holes therein adapted to receive candies therein.

2. A device of the class described comprising a roller having a belt band trained about each end thereof, spaced-apart pins on each of said bands, racks having slotted ends engageable in said pins removably mounted on said bands and bridging said bands, said racks being provided with holes adapted to receive candies therein, and means for shaking said bands to cause said candies to fall into said holes.

3. A device of the class described comprising a roller having a belt band trained about each end thereof, spaced-apart pins on each of said bands, racks having slotted ends engageable in said pins removably mounted on said bands and bridging said bands, said racks having holes therein adapted to receive candies, and a guard surrounding one side of said roller to prevent said candies from falling out of said racks while said racks are passing around said roller.

4. A feeding device for candy coating machines and similar apparatus comprising a roller, a belt band trained about each end of said roller, spaced-apart pins on each of said bands, a plurality of racks having slotted ends engageable in said pins removably mounted on said bands and bridging said bands, said racks being provided with holes adapted to receive the candies therein, means for shaking said bands to cause said candies to fall into said holes, a second roller, means transmitting the rotation of the first roller to the second roller, and a conveyor belt trained about said second roller, said latter conveyor belt being adapted to receive the articles to be fed from said racks and feed the same to the respective machine without disturbing the uniform order or arrangement.

5. A feeding device for candy coating machines and similar apparatus comprising a roller, a belt band trained about each end of said roller, spaced-apart pins on each of said bands, a plurality of racks having slotted ends engagable in said pins removably mounted on said bands and bridging said bands, said racks having holes therein adapted to receive the articles to be coated, a guard surrounding one side of said roller to prevent said articles from falling out of said racks while said racks are passing around said roller, a second roller, means transmitting the rotation of the first roller to the second roller, and a conveyor belt trained about said second roller, said latter conveyor belt being adapted to receive the articles to be fed from said racks and feed the same to the respective machine without disturbing the uniform order or arrangement.

JOHN B. DILGER.
CHARLES ALLEGRI.